(12) United States Patent
Beckerman et al.

(10) Patent No.: US 11,259,906 B2
(45) Date of Patent: Mar. 1, 2022

(54) CASE FOR DENTAL TREATMENT DEVICE

(71) Applicant: Colgate-Palmolive Company, New York, NY (US)

(72) Inventors: Scott Beckerman, South Orange, NJ (US); Andrew Lanza, West New York, NJ (US)

(73) Assignee: Colgate-Palmolive Company, New York, NY (US)

( * ) Notice: Subject to any disclaimer, the term of this patent is extended or adjusted under 35 U.S.C. 154(b) by 231 days.

(21) Appl. No.: 16/330,249

(22) PCT Filed: Sep. 6, 2016

(86) PCT No.: PCT/US2016/050356
§ 371 (c)(1),
(2) Date: Mar. 4, 2019

(87) PCT Pub. No.: WO2018/048381
PCT Pub. Date: Mar. 15, 2018

(65) Prior Publication Data
US 2019/0201177 A1   Jul. 4, 2019

(51) Int. Cl.
*A45D 44/18*    (2006.01)
*A61C 19/02*    (2006.01)
(Continued)

(52) U.S. Cl.
CPC ............. *A61C 19/02* (2013.01); *A45C 11/00* (2013.01); *A45D 44/18* (2013.01);
(Continued)

(58) Field of Classification Search
CPC ...... A45D 44/18; A45D 44/20; A61C 19/008; B65D 2251/1033; B65D 25/24; B65D 2585/54; B65D 85/54
(Continued)

(56) References Cited

U.S. PATENT DOCUMENTS 1,807,220 A * 5/1931 Leberman ............... A45C 13/06
                                                           292/145
2,642,202 A * 6/1953 Cowan .................... A45C 11/24
                                                           220/844
(Continued)

FOREIGN PATENT DOCUMENTS

CN          202098709          1/2012
CN          204033526 U       12/2014
(Continued)

OTHER PUBLICATIONS

International Search Report and Written Opinion of the International Searching Authority in International Application No. PCT/US2016/050356, dated May 15, 2017.

*Primary Examiner* — Mollie Impink

(57) ABSTRACT

A case for a dental treatment device includes a bottom panel having an inner surface and an outer surface. The inner surface of the bottom panel defines a first concave portion that corresponds to a shape of a bottom of the dental treatment device. The first concave portion forms a corresponding first convex portion of the outer surface of the bottom panel. The case also includes a top panel having an inner surface and an outer surface. The inner surface of the top panel defines a second concave portion that corresponds to a shape of a top of the dental treatment device. The second convex portion forms a corresponding second convex portion of the outer surface of the top panel.

14 Claims, 12 Drawing Sheets

(51) Int. Cl.
  *A45C 11/00* (2006.01)
  *B65D 25/24* (2006.01)
  *A61C 19/06* (2006.01)
(52) U.S. Cl.
  CPC ....... *A45C 2011/007* (2013.01); *A61C 19/066* (2013.01); *B65D 25/24* (2013.01)
(58) Field of Classification Search
  USPC .......................................... 206/368; 220/833
  See application file for complete search history.

(56) References Cited

U.S. PATENT DOCUMENTS

| | | | | |
|---|---|---|---|---|
| 3,511,433 | A * | 5/1970 | Andrews | B65D 43/162 220/4.23 |
| 4,005,800 | A * | 2/1977 | Schurman | B65D 11/16 220/831 |
| 4,697,700 | A * | 10/1987 | Weissman | A61C 13/0027 206/467 |
| 5,063,940 | A * | 11/1991 | Adell | A63B 71/085 128/861 |
| 5,226,558 | A * | 7/1993 | Whitney | B65D 25/38 206/386 |
| 6,082,995 | A * | 7/2000 | Wise | A61C 7/08 128/861 |
| 6,499,494 | B2 * | 12/2002 | Berghash | A61C 17/036 134/135 |
| 6,705,333 | B1 * | 3/2004 | Pourcho | A45D 44/20 134/135 |
| 7,434,684 | B1 * | 10/2008 | Mabra | F41B 5/14 206/315.11 |
| D582,559 | S | 12/2008 | Khawaled et al. | |
| 7,775,795 | B2 | 8/2010 | Khawaled et al. | |
| D661,806 | S | 6/2012 | Khawaled et al. | |
| 2003/0169680 | A1 * | 9/2003 | Volan | G11B 33/0416 720/728 |
| 2004/0244805 | A1 | 12/2004 | Cook et al. | |
| 2008/0283422 | A1 * | 11/2008 | Jansheski | B65D 85/54 206/63.5 |
| 2015/0090729 | A1 * | 4/2015 | Sargable | B65D 25/24 220/694 |
| 2016/0100924 | A1 * | 4/2016 | Wilson | H02J 50/10 206/63.5 |
| 2018/0243060 | A1 * | 8/2018 | Wilson | G06N 3/08 |

FOREIGN PATENT DOCUMENTS

| | | | | |
|---|---|---|---|---|
| CN | 205181516 | | 4/2016 | |
| EP | 2054011 | | 5/2009 | |
| EP | 2653054 | | 10/2013 | |
| FR | 2848811 | A1 * | 6/2004 | ............ A61C 19/02 |
| GB | 2521803 | A | 7/2015 | |
| JP | 2014226639 | | 12/2014 | |
| KR | 20140044352 | A | 4/2014 | |
| RU | 104034 | | 5/2011 | |
| WO | WO-2006031162 | A1 * | 3/2006 | ............ A61F 2/0095 |
| WO | WO-2017147604 | A1 * | 8/2017 | ............ A61C 7/36 |

* cited by examiner

CASE FOR DENTAL TREATMENT DEVICE

BACKGROUND

Dental treatment devices are oftentimes stored in a case when not in use. One conventional case is substantially egg-shaped and includes a top panel and a bottom panel. An inner surface of the bottom panel includes a plurality of posts that extend upward therefrom toward the top panel. When the case is in an open position, the dental treatment device may be inserted therein, and the posts hold the dental treatment device in place. The bottom panel and the top panel are hinged together to allow the case to be closed to store the dental treatment device until the user is ready to use it again. The posts may not guide the dental treatment device into the proper position when the dental treatment device is initially misaligned, which may prevent the case from being closed.

BRIEF SUMMARY

A case for a dental treatment device is disclosed. The case includes a bottom panel having an inner surface and an outer surface. The inner surface of the bottom panel defines a first concave portion that corresponds to a shape of a bottom of the dental treatment device. The first concave portion forms a corresponding first convex portion of the outer surface of the bottom panel. The case also includes a top panel having an inner surface and an outer surface. The inner surface of the top panel defines a second concave portion that corresponds to a shape of a top of the dental treatment device. The second convex portion forms a corresponding second convex portion of the outer surface of the top panel. The case also includes a hinge that joins the bottom panel and the top panel and allows the bottom panel and the top panel to pivot between an open position and a closed position. The first concave portion and the second concave portion define an internal volume for storing the dental treatment device when the bottom panel and the top panel are in the closed position.

In another embodiment, the case includes a bottom panel having an inner surface and an outer surface. The inner surface of the bottom panel defines a first concave portion that forms a corresponding first convex portion of the outer surface of the bottom panel. One or more protrusions extend from the outer surface of the bottom panel. The one or more protrusions resemble an outline of the dental treatment device. The case also includes a top panel having an inner surface and an outer surface. The inner surface of the top panel defines a second concave portion that forms a corresponding second convex portion of the outer surface of the top panel. The case also includes a hinge that joins the bottom panel and the top panel and allows the bottom panel and the top panel to pivot between an open position and a closed position. The first concave portion and the second concave portion define an internal volume for storing the dental treatment device when the bottom panel and the top panel are in the closed position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawing, wherein.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Figure 1:
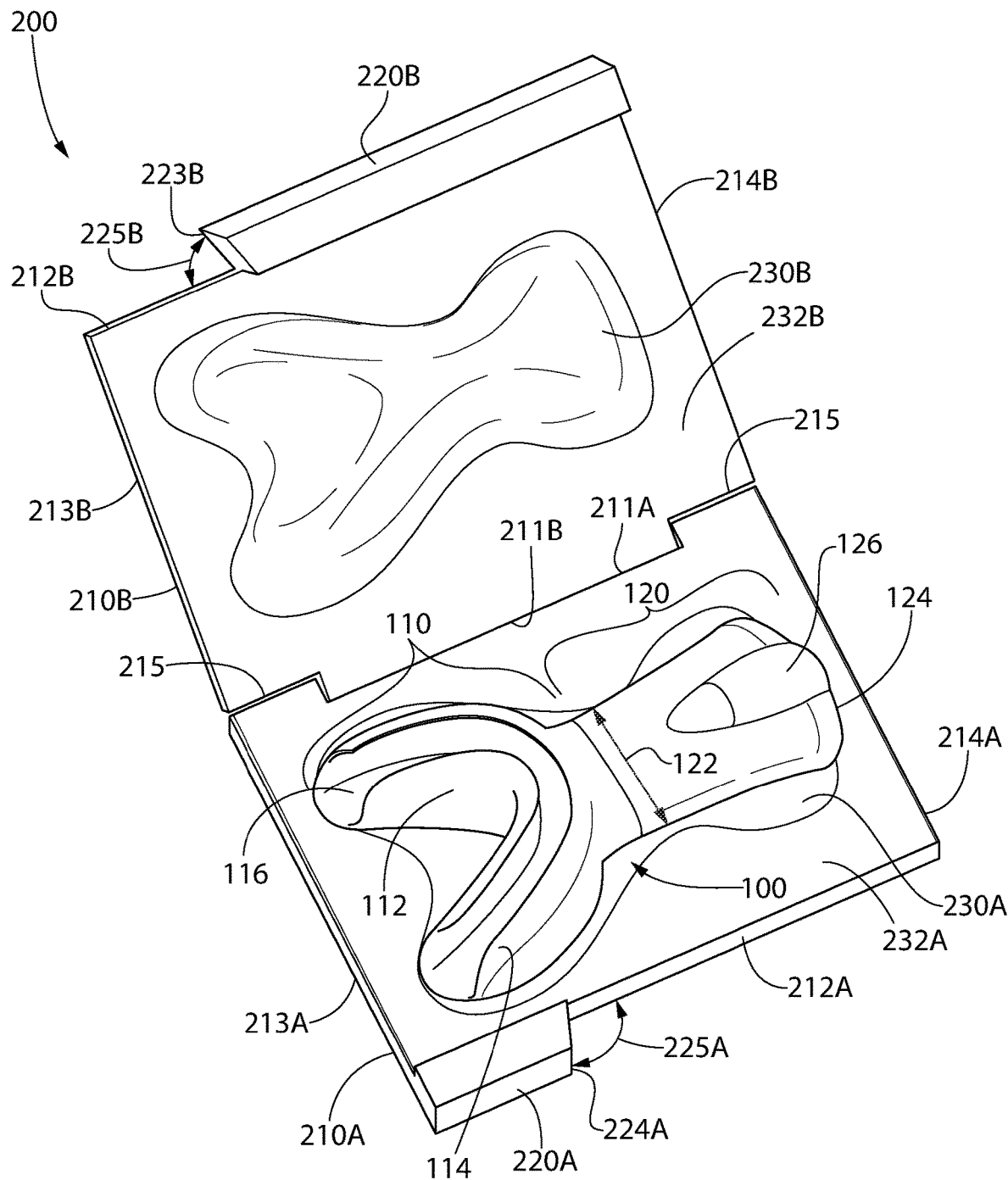
FIG. 1 depicts a perspective view of a case in an open position having a dental treatment device positioned therein, according to an embodiment.

FIG. 1 depicts a perspective view of a dental treatment device 100 positioned in a case 200, according to an embodiment. The dental treatment device 100 may be or include a tooth-whitening device, a mouth-guard, a denture, a retainer, a tooth brush, or the like. As shown, the dental treatment device 100 may be or include a tooth-whitening device that whitens using electrical current to activate a chemical compound (e.g., hydrogen peroxide).

The dental treatment device 100 may include a tray 110 and a handle 120. The tray 110 may include an inner curved wall 112 and an outer curved wall 114. A curved recess 116 may be defined between the inner and outer curved walls 112, 114. When the dental treatment device 100 is positioned in the user's mouth, the inner curved wall 112 contacts the user's teeth and/or gums, the user's teeth are positioned within the curved recess 116, and the user's lips extend at least partially over the outer curved wall 114. Although only a top of the dental treatment device 100 may be seen in FIG. 1, the shape of the bottom of the dental treatment device 100 may be substantially similar to accommodate the user's lower teeth, gums, and lip.

The handle 120 may extend laterally from the outer curved wall 114. A cross-sectional width 122 of the handle 120 may remain substantially constant proceeding away from the outer curved wall 114, or, as shown, the width 122 may slightly increase proceeding away from the outer curved wall 114. An end 124 of the handle 120 may be curved. In addition, a top (and/or a bottom) of the handle 120 may include a convex portion 126.

When not in use, the dental treatment device 100 may be positioned within the case 200. The case 200 may include a first (e.g., bottom) panel 210A and a second (e.g., top) panel 210B. The bottom panel 210A may include one or more sides (four are shown: 211A-214A). Similarly, the top panel 210B may include one or more sides (four are shown: 211B-214B). For example, in the embodiment shown, the bottom and top panels 210A, 210B may be substantially rectangular. The bottom panel 210A and the top panel 210B may be coupled together by one or more hinges (two are shown: 215) along their respective first sides 211A, 211B.

The bottom panel 210A may include a first tab 220A that extends laterally from the second side 212A of the bottom panel 210A. The first tab 220A may be positioned closer to the third side 213A of the bottom panel 210A than the fourth side 214A of the bottom panel 210A. The first tab 220A may extend from about 10% to about 40% of a length of the second side 212A of the bottom panel 210A. The first tab 220A may extend upward from the bottom panel 210A so as to mate with a second tab (introduced below) when the case 200 is in the closed position. The first tab 220A may include a tapered side 224A that faces either the third side 213A or the fourth side 214A (as shown) of the bottom panel 210A. The tapered side 224A of the first tab 220A may be oriented at an angle 225A with respect to the second side 212A of the bottom panel 210A. The angle 225A may be from about 90° to about 170°, about 95° to about 150°, or about 100° to about 130°.

The top panel 210B may include a second tab 220B that extends laterally from the second side 212B of the top panel 210B. The second tab 220B may be positioned closer to the fourth side 214B of the top panel 210B than the third side 213B of the top panel 210B. The second tab 220B may extend from about 60% to about 90% of a length of the second side 212B of the top panel 210B. The second tab 220B may include a tapered side 223B. The tapered side 223B of the second tab 220B may be oriented at an angle 225B that is supplementary to the angle 225A described above such that the tapered sides 225A, 225B may be aligned when the case 200 is in the closed position.

The inner surface of the bottom panel 210A may define a bottom concave portion 230A, and the inner surface of the top panel 210B may define a top concave portion 230B, where concave is defined relative to the inside of the case 200 when in the open position as shown in FIG. 1. A remainder of the inner surface of the bottom panel 210A may be a substantially planar portion 232A, and a remainder of the inner surface of the top panel 210B may be a substantially planar portion 232B. The bottom and top concave portions 230A, 230B may together define an internal volume when the case 200 is in a closed position (see FIG. 2) in which the dental treatment device 100 may be stored. Thus, the bottom concave portion 230A may be in substantially the same shape as the bottom of the dental treatment device 100, and the top concave portion 230B may be in substantially the same shape as the top of the dental treatment device 100, or vice versa. In one embodiment, the bottom and top concave portions 230A, 230B may be mirror images of one another; however, in other embodiments, the bottom and top concave portions 230A, 230B may differ from one another (e.g., if the bottom and top of the dental treatment device 100 are shaped or proportioned differently). The wall(s) defining the bottom and top concave portions 230A, 230B may be sloped or curved such that the depth of the concave portions 230A, 230B increases gradually, as discussed in greater detail below.

Figure 2:
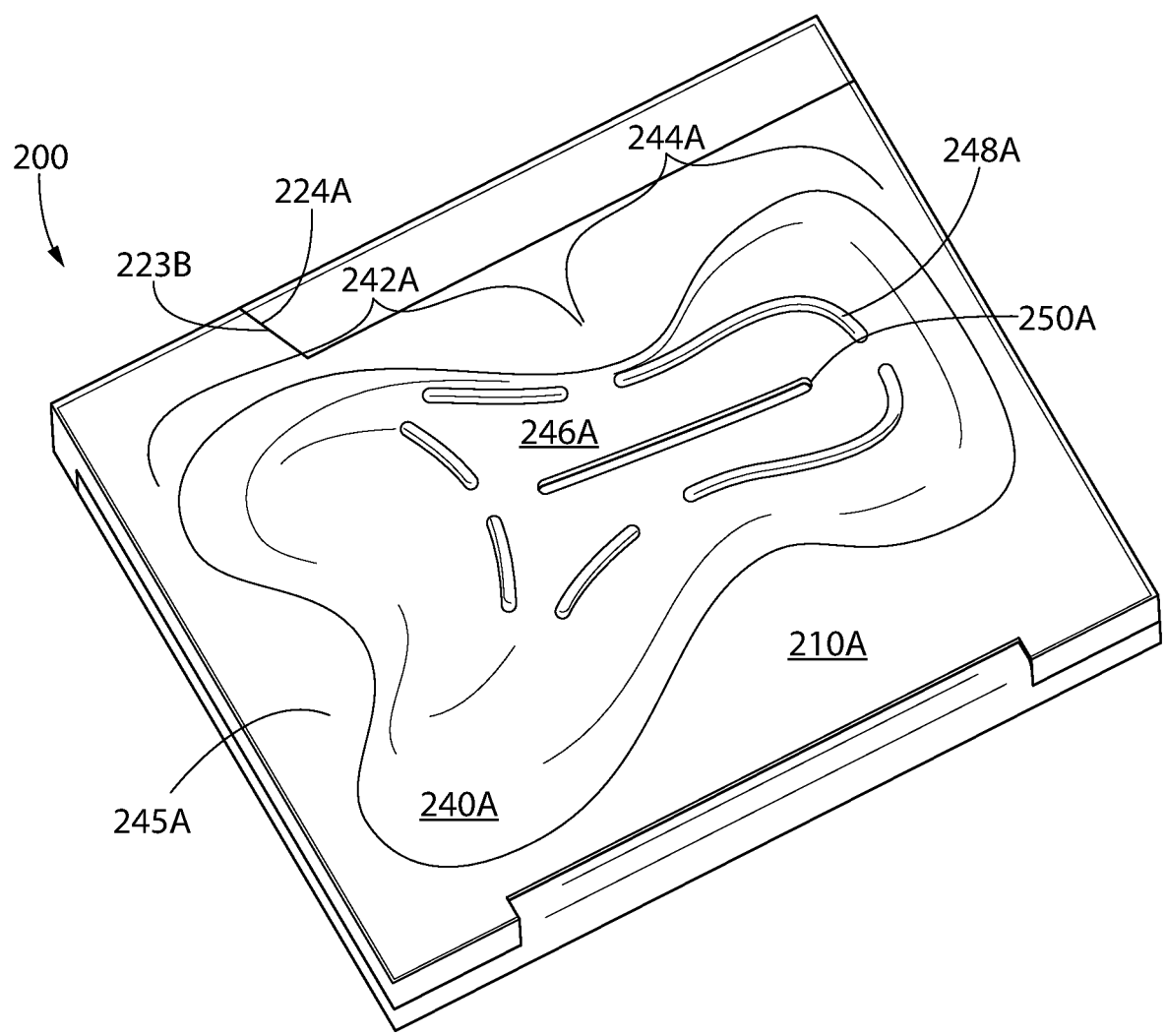
FIG. 2 depicts a perspective view of an outer surface of a first (e.g., bottom) panel of the case when the case is in a closed position, according to an embodiment.

FIG. 2 depicts a perspective view of the outer surface of the bottom panel 210A of the case 200 when the case is 200 in the closed position, according to an embodiment. The bottom concave portion 230A formed in the inner surface of the bottom panel 210A may form or be referred to as a bottom convex portion 240A relative to the outer surface of the bottom panel 210A. More particularly, as the depth of the bottom concave portion 230A formed in the inner surface of the bottom panel 210A increases, the height/elevation of the bottom convex portion 240A of the outer surface of the bottom panel 210A also increases. As a result, the bottom convex portion 240A may have a shape that resembles the shape of the bottom of the dental treatment device 100. More particularly, the wall(s) defining the bottom convex portion 240A may include a tray-accommodating portion 242A and a handle accommodating portion 244A. The tray-accommodating portion 242A may be substantially crescent-shaped. A remainder of the outer surface of the bottom panel 210A may be a substantially planar portion 245A.

The bottom convex portion 240A of the outer surface of the bottom panel 210A may include a substantially planar portion 246A. The substantially planar portion 246A may have a shape that resembles the shape of the bottom of the dental treatment device 100. As in the example shown, one or more protrusions (six are shown: 248A) may extend from the bottom convex portion 240A of the outer surface of the bottom panel 210A. As shown, the protrusions 248A may extend from the substantially planar portion 246A of the bottom convex portion 240A. In other embodiments, the protrusions 248A may extend from the substantially planar portion 245A. The protrusions 248A may have the same heights or different heights. The height of a single protrusion 248A may remain constant or vary. The protrusions 248A may be arranged around an outline of the substantially planar portion 246A such that the protrusions 248A have a shape that resembles the bottom of the dental treatment device 100, (e.g. the tray and the handle). When the case 200 is positioned on a surface (e.g., a table top), the case 200 may rest upon the protrusions 248A such that the protrusions 248A are the only part of the case 200 to contact the surface. As a result, a remainder of the case 200 may be spaced apart from the surface.

One or more first openings (one is shown: 250A) may be formed through the bottom panel 210A. The first opening 250A may extend through the substantially planar portion 246A (e.g., between the outline formed by the protrusions 248A). The first opening 250A may provide a path of fluid communication between the internal volume of the case 200 and an exterior of the case 200. The path may allow liquid (e.g., water, whitening composition, saliva, etc.) in the bottom convex portion 240A to drain therethrough and air to circulate therethrough. Also shown in FIG. 2, when the case 200 is in the closed position, the tapered sides 224A, 223B of the first and second tabs 220A, 220B may be aligned.

Figure 3:
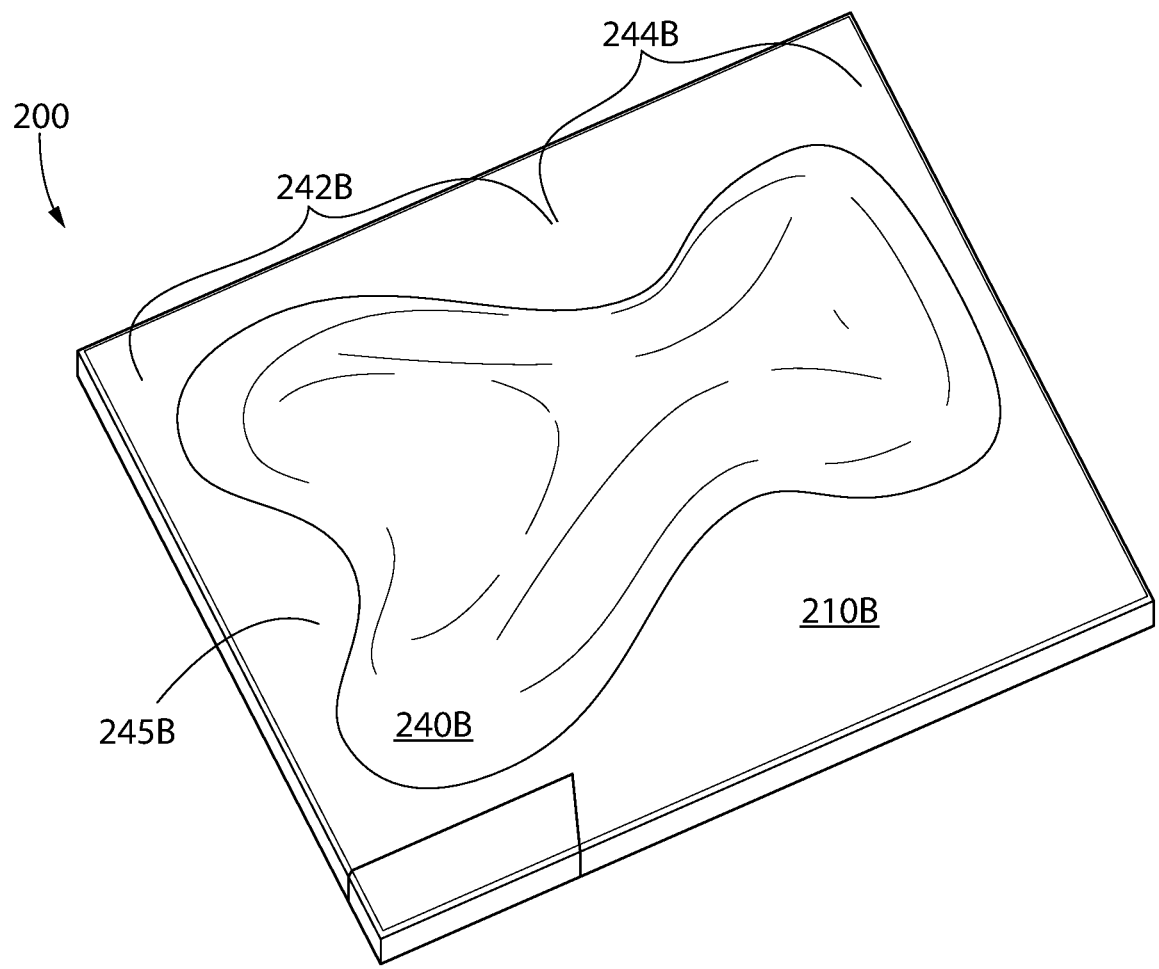
FIG. 3 depicts a perspective view of an outer surface of a second (e.g., top) panel of the case when the case is in the closed position, according to an embodiment.

FIG. 3 depicts a perspective view of the outer surface of the top panel 210B of the case 200 when the case 200 is in the closed position, according to an embodiment. The top concave portion 230B formed in the inner surface of the top panel 210B may form a top convex portion 240B relative to the outer surface of the top panel 210B. More particularly, as the depth of the top concave portion 230B formed in the inner surface of the top panel 210B increases, the height/elevation of the top convex portion 240B of the outer surface of the top panel 210B also increases. As a result, the top convex portion 240B may have a shape that resembles the shape of the top of the dental treatment device 100. More particularly, the wall(s) defining the top convex portion 240B may include a tray-accommodating portion 242B and a handle accommodating portion 244B. The tray-accommodating portion 242B may be substantially crescent-shaped. A remainder of the outer surface of the top panel 210B may be a substantially planar portion 245B.

Figure 4:
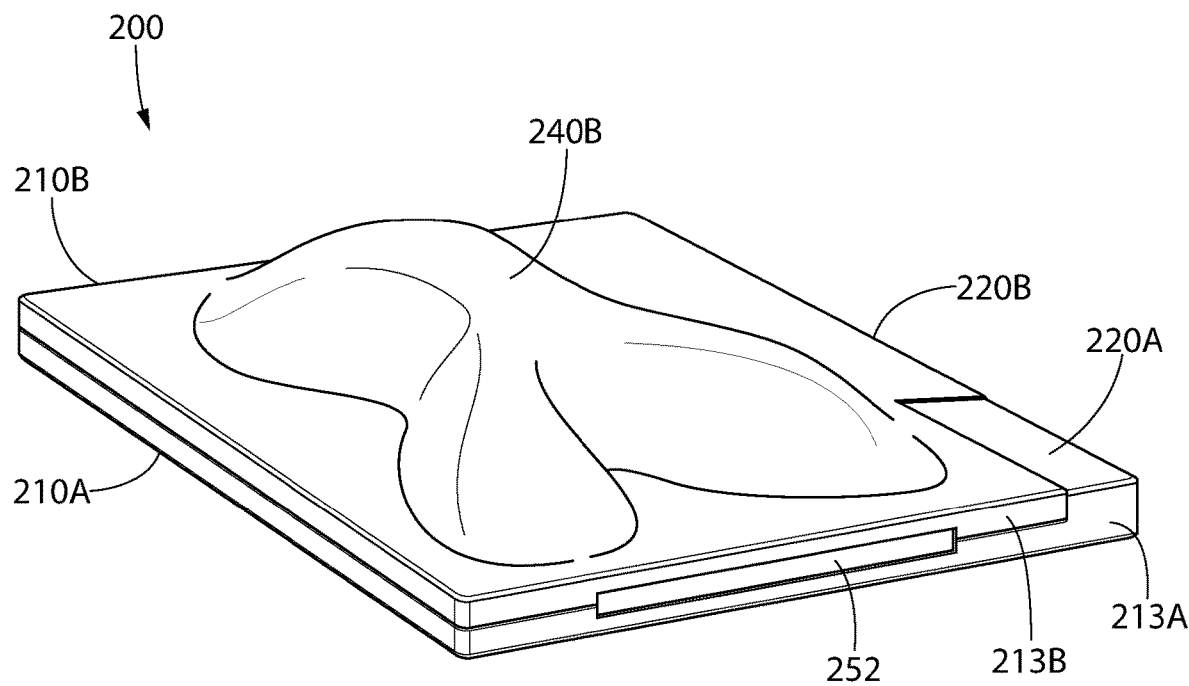
FIG. 4 depicts a perspective view of the case having an opening formed in a side thereof, according to an embodiment.

FIG. 4 depicts a perspective view of the case 200 having a second opening 252 formed in a side thereof, according to an embodiment. Instead of, or in addition to, the first opening 250A described above, the case 200 may include a second opening 252. The second opening 252 may be formed through one of the sides of the case 200. As shown, the second opening 252 may be formed through the third sides 213A, 213B of the bottom panel 210A and the top panel 210B; however, as will be appreciated, the second opening 252 may be formed through other sides of the bottom panel 210A and/or the top panel 210B. The second opening 252 may provide a path of fluid communication between the internal volume of the case 200 and an exterior of the case 200. The path may allow air flow therethrough. In at least one embodiment, a power cord may extend through the second opening 252, and the cord may be used to charge a battery of the dental treatment device 100 when the dental treatment device 100 is in the case 200, and the case 200 is closed.

Figure 5:
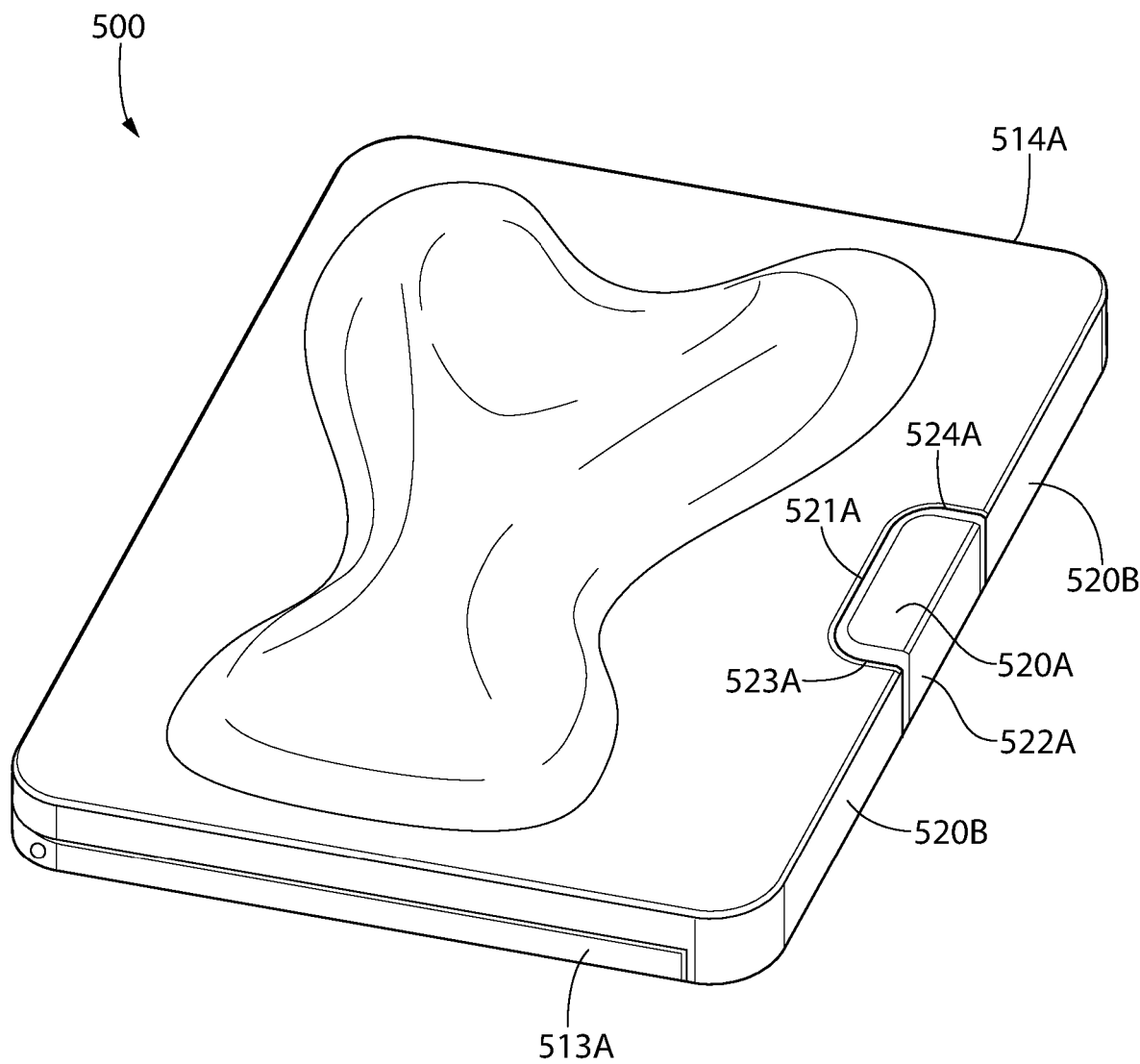
FIG. 5 depicts a perspective view of another case in a closed position, according to an embodiment.
Figure 6:
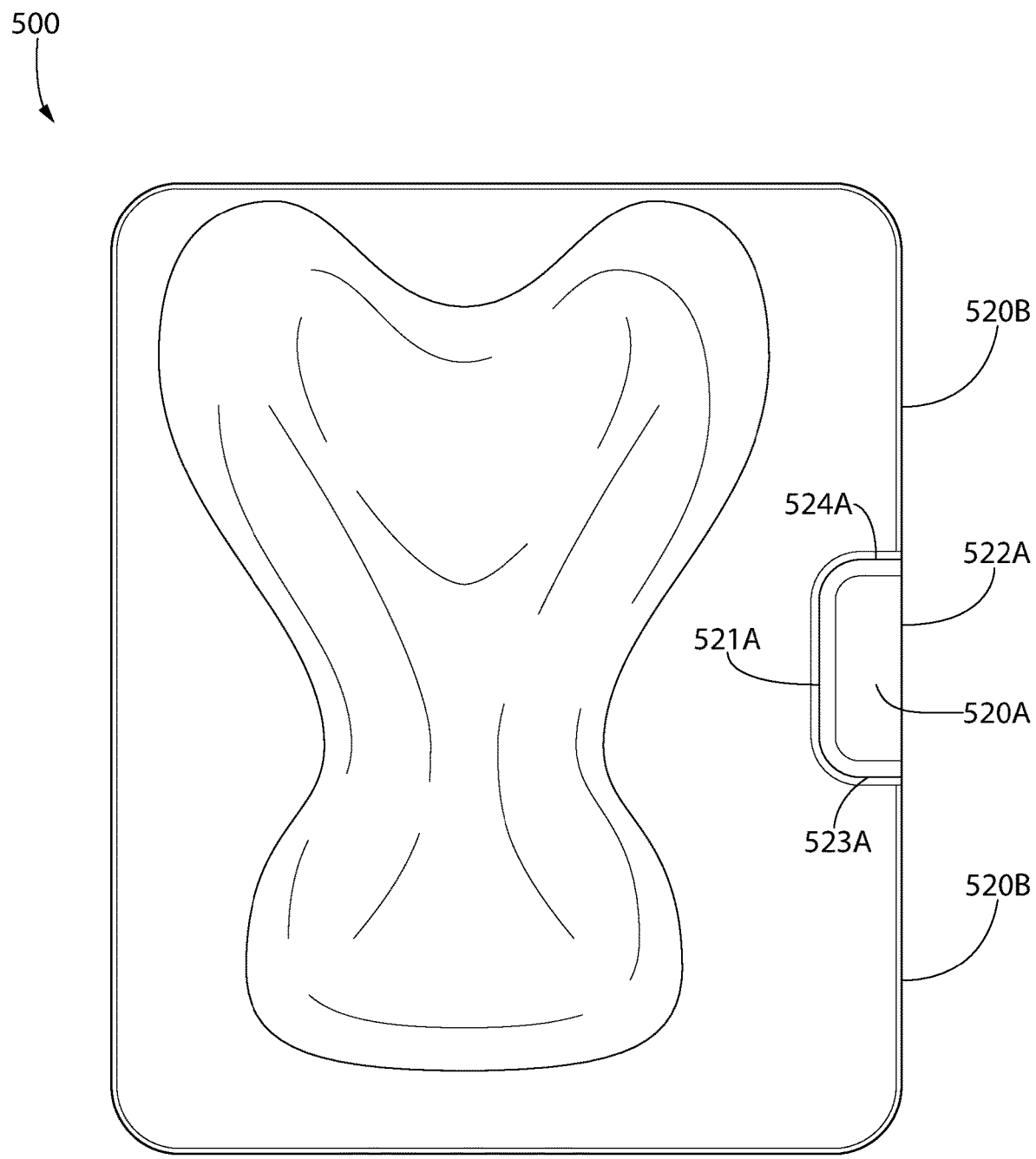
FIG. 6 depicts a top view of the case from FIG. 5 in the closed position, according to an embodiment.

FIGS. 5 and 6 depict a perspective view and a top view of another case 500 in a closed position, according to an embodiment. In the case 500, the first tab 520A may be positioned substantially equidistant between the third and fourth sides 513A, 514A of the bottom panel 510A. The second tab 520B may include two portions defining a slot therebetween. The first tab 520A may extend upward from the bottom panel 510A to be received within the slot. Thus, the first tab 520A may be positioned between the two portions of the second tab 520B.

In addition, the first tab 520A may be shaped differently in the case 500 than in the case 200. More particularly, the first tab 520A may have a first side 521A, a second side 522A, a third side 523A, and a fourth side 524A. The first and second sides 521A, 522A of the first tab 520A may be substantially parallel to one another, and the third and fourth sides 523A, 524A of the first tab 520A may be substantially parallel to one another. The first and second sides 521A, 522A of the first tab 520A may be substantially perpendicular to the third and fourth sides 523A, 524A of the first tab 520A. A radius of curvature may exist between the first side 521A and the third side 523A and between the first side 521A and the fourth side 524A.

Figure 7:
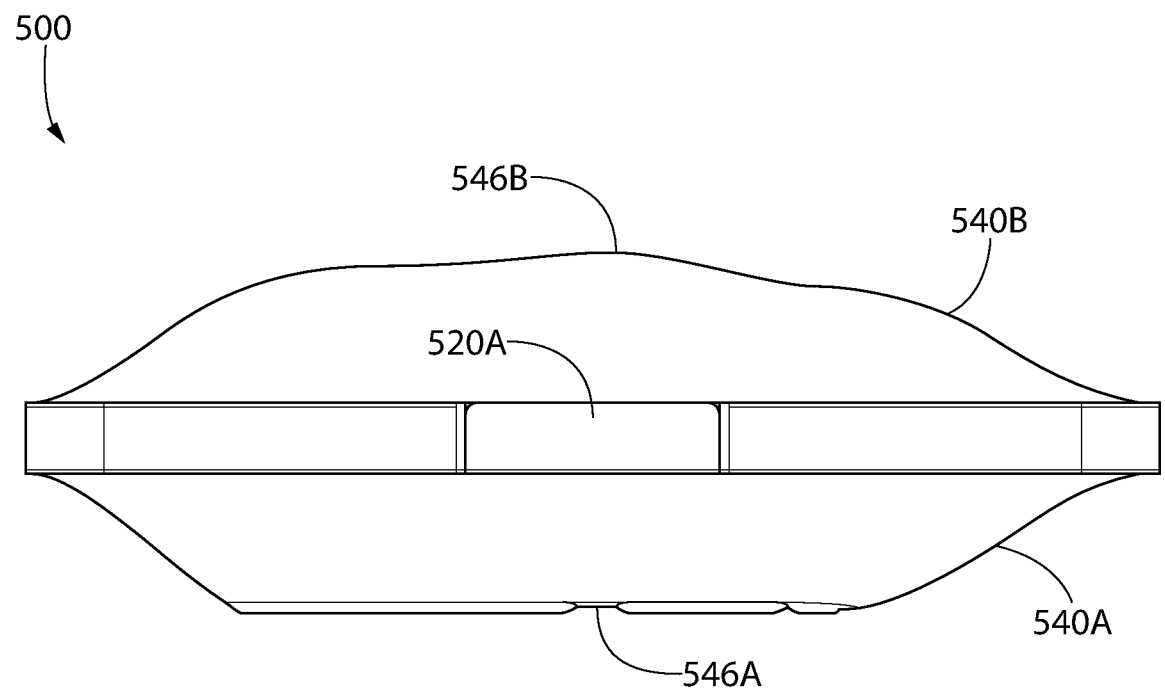
FIG. 7 depicts a front view of the case from FIG. 5 in the closed position, according to an embodiment.
Figure 8:
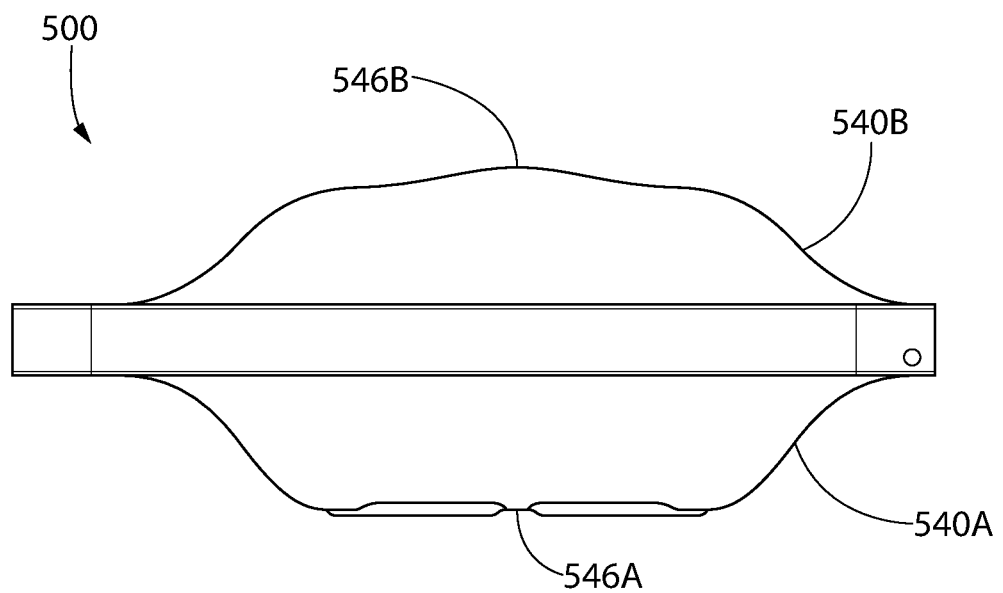
FIG. 8 depicts a side view of the case from FIG. 5 in the closed position, according to an embodiment.

FIGS. 7 and 8 depict a front view and a side view of the case 500 in the closed position, according to an embodiment. While the bottom convex portion 540A may include the substantially planar portion 546A, the top convex portion 540B may not include a substantially planar portion. Rather, the top convex portion 540B may include a curvature 546B. The case 500 may not be stable when the curvature 546B is positioned on the surface (e.g., table top), signaling to the user that the case 500 should be flipped to rest upon the other side.

Figure 9:
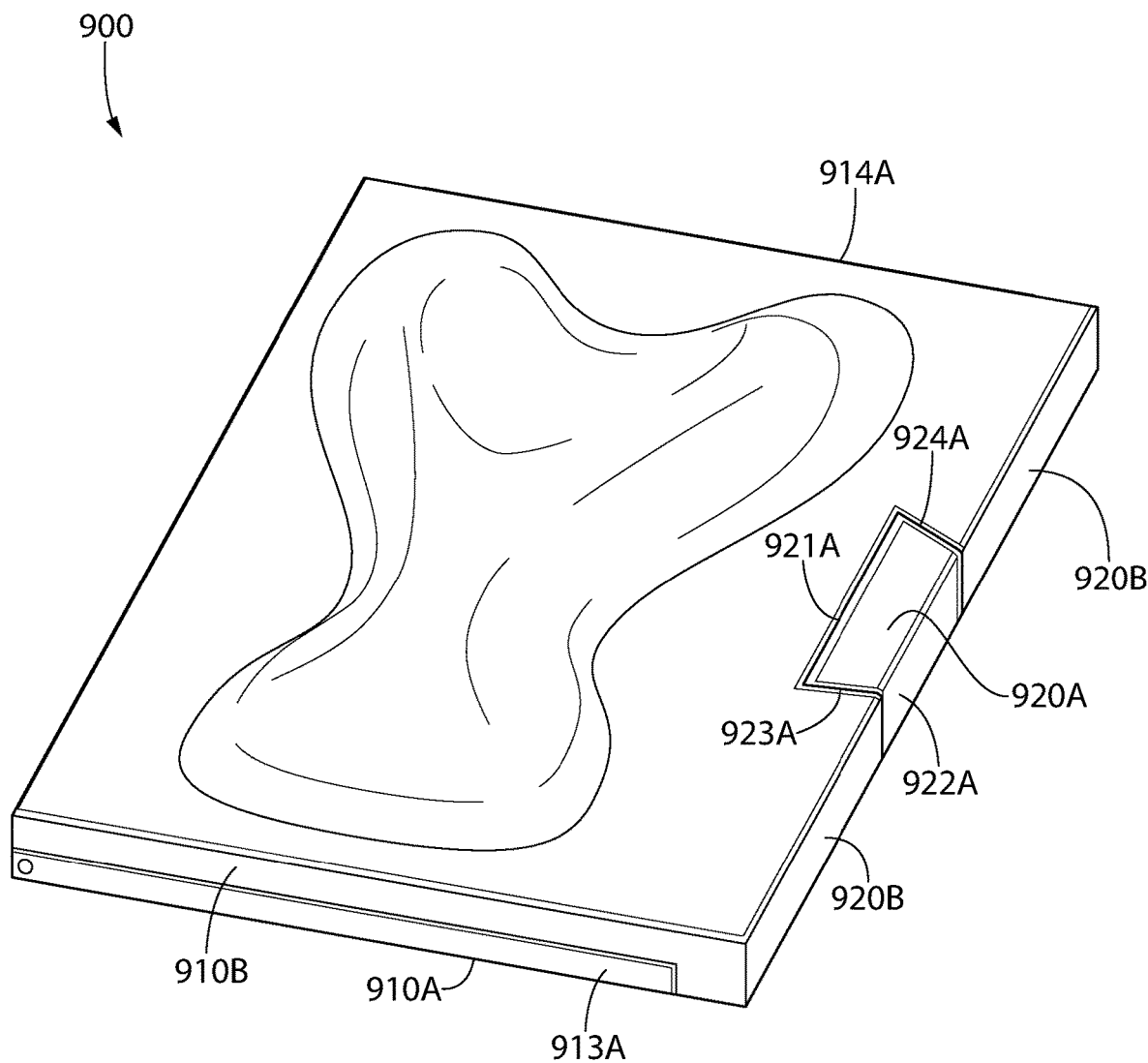
FIG. 9 depicts a perspective view of another case in a closed position, according to an embodiment.

FIG. 9 depicts a perspective view of another case 900 in a closed position, according to an embodiment. In the case 900, the first tab 920A may be positioned substantially equidistant between the third and fourth sides 913A, 914A of the bottom panel 910A. The second tab 920B may include two portions defining a slot therebetween. The first tab 920A may extend upward from the bottom panel 910A to be received within the slot. Thus, the first tab 920A may be positioned between the two portions of the second tab 920B.

In addition, the first tab 920A may be shaped differently in the case 900 than in the cases 200, 500. More particularly, the first tab 920A may have a first side 921A, a second side 922A, a third side 923A, and a fourth side 924A. The first and second sides 921A, 922A of the first tab 920A may be substantially parallel to one another. The third and fourth sides 923A, 924A of the first tab 920A may not be substantially parallel to one another. More particularly, the third and fourth sides 923A, 924A may be oriented at an acute angle with respect to one another such that the first side 921A is longer than the second side 922A.

Figure 10:
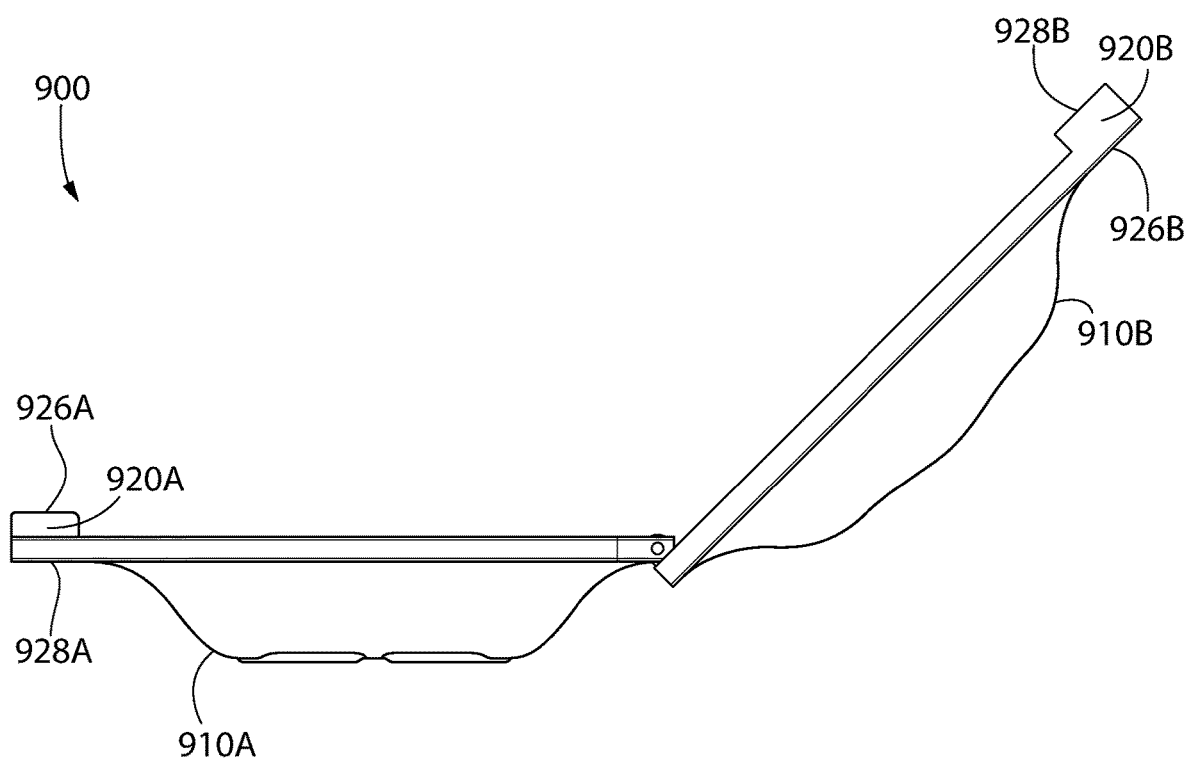
FIG. 10 depicts a side view of the case from FIG. 9 in the open position, according to an embodiment.

FIG. 10 depicts a side view of the case 900 in the open position, according to an embodiment. The first tab 920A may extend upward from the bottom panel 910A, and the second tab 920B may extend downward from the top panel 910B. When the case 900 is closed (see FIG. 9), an upper surface 926A of the first tab 920A may be aligned with an upper surface of the second tab 920B, and a lower surface 928A of the first tab 920A may be aligned with a lower surface 928B of the second tab 920B.

Figure 11:
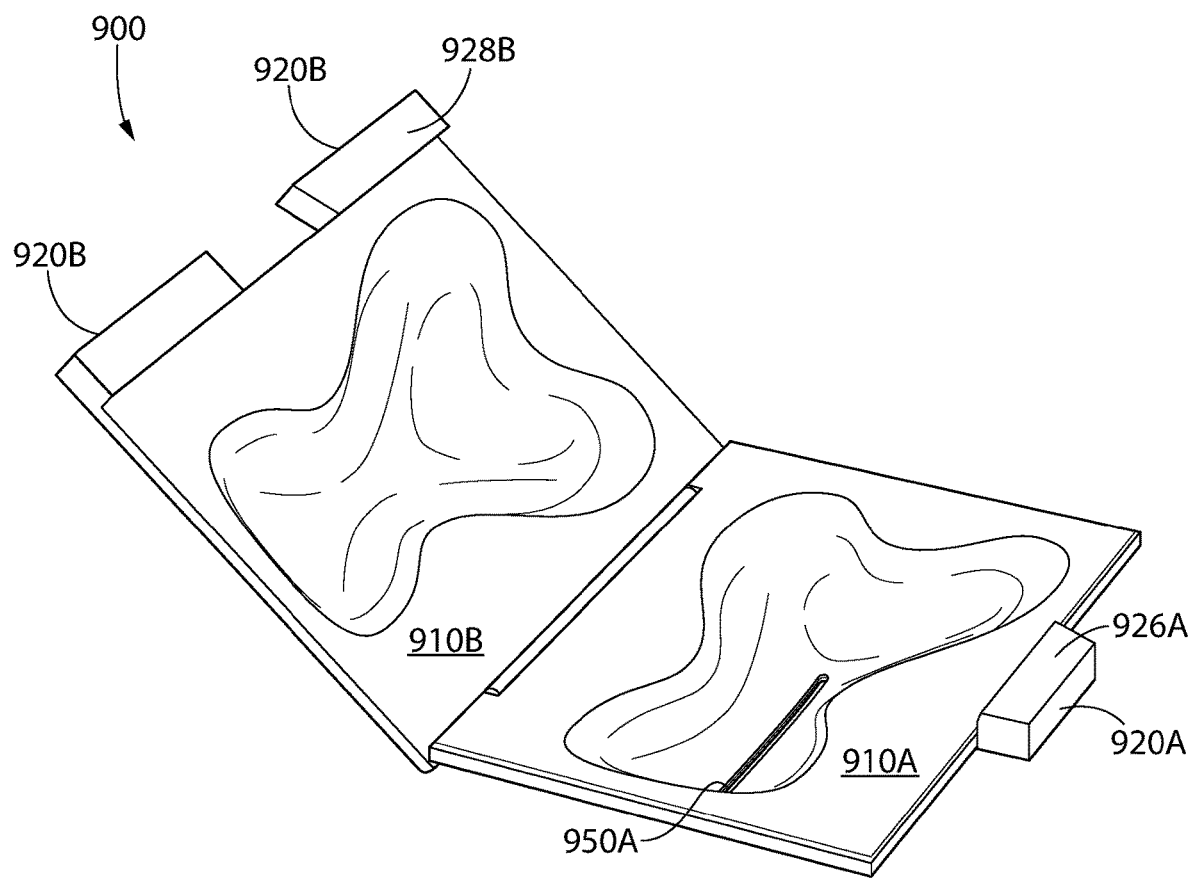
FIG. 11 depicts a perspective view of the case from FIG. 9 in an open position, according to an embodiment.
Figure 12:
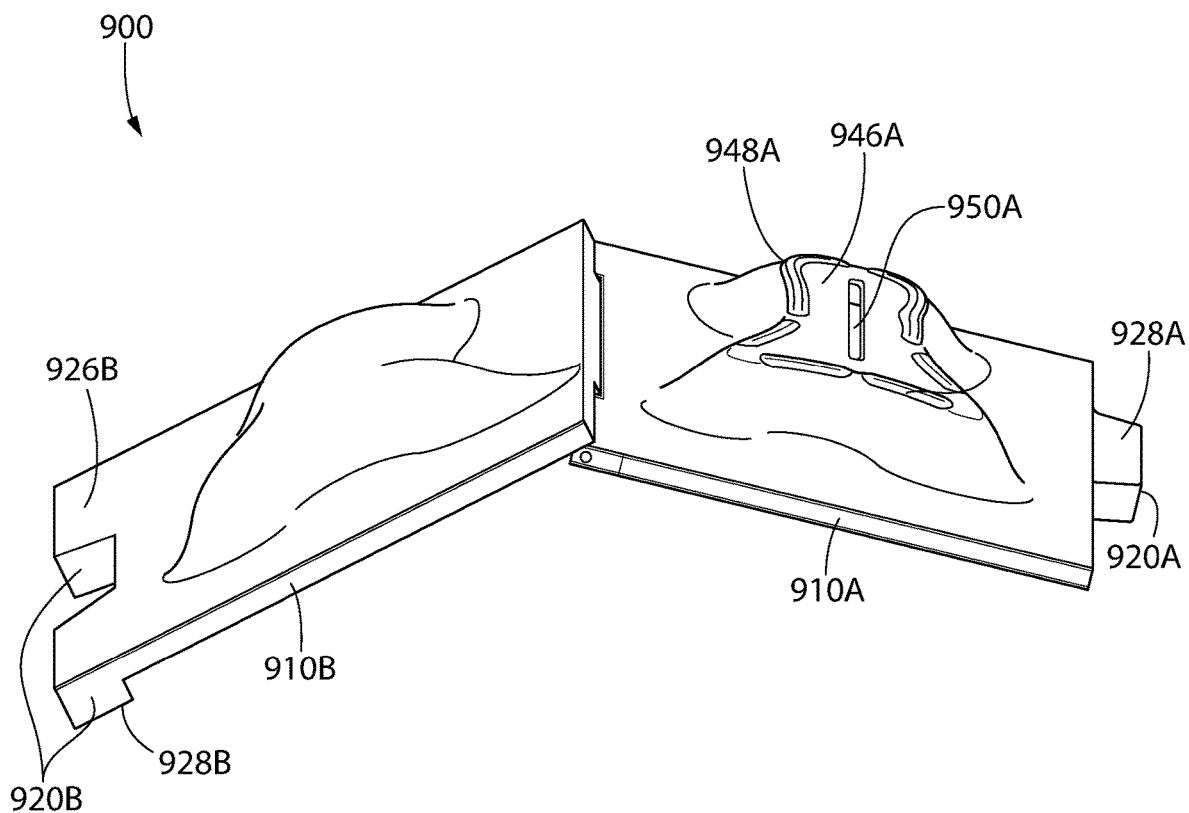
FIG. 12 depicts a perspective view of the case from FIG. 9 in the open position, according to an embodiment.

FIGS. 11 and 12 depict perspective views of the case 900 in an open position, according to an embodiment. The bottom panel 910A may include the substantially planar portion 946A. The protrusions 948A may be arranged around an outline of the substantially planar portion 946A such that the protrusions 948A have a shape that resembles the bottom of the dental treatment device 100, (e.g., that corresponds with the outline(s) of the tray and/or the handle of the dental treatment device 100). The first opening 950A may extend through the substantially planar portion 946A (e.g., between the outline formed by the protrusions 948A).

In some embodiments, one or both of the top panel 210B, 510B, 910B and the bottom panel 210A, 510A, 910A may be transparent or translucent such that a consumer may view the dental treatment device 100 stored within the case 200, 500, 900. In some embodiments, one or both of the top panel 210B, 510B, 910B and the bottom panel 210A, 510A, 910A may be opaque and may be of different colors.

What is claimed is:

1. A case for a dental treatment device, comprising:
   a bottom panel having an inner surface and an outer surface, wherein the inner surface of the bottom panel defines a first concave portion that corresponds to a shape of a bottom of the dental treatment device, wherein the first concave portion forms a corresponding first convex portion of the outer surface of the bottom panel, wherein a remainder of the bottom panel is substantially planar;
   a top panel having an inner surface and an outer surface, wherein the inner surface of the top panel defines a second concave portion that corresponds to a shape of a top of the dental treatment device, wherein the second concave portion forms a corresponding second convex portion of the outer surface of the top panel; and
   a hinge that directly joins the bottom panel and the top panel to one another and allows the bottom panel and the top panel to pivot between an open position and a closed position;
   wherein the first concave portion and the second concave portion define an internal volume for storing the dental treatment device when the bottom panel and the top panel are in the closed position;
   wherein a wall defining the first convex portion includes a crescent-shaped tray-accommodating portion and a handle accommodating portion;

wherein the bottom panel comprises a first tab, wherein the top panel comprises a second tab, wherein an upper surface of the first tab is substantially aligned with an upper surface of the second tab when the case is in the closed position, and wherein a lower surface of the first tab is substantially aligned with a lower surface of the second tab when the case is in the closed position, wherein the first tab extends upward from the bottom panel and the second tab extends downward from the top panel, and wherein the second tab comprises first and second portions defining a slot therebetween, and wherein the first tab is positioned within the slot when the case is in the closed position.

2. The case of claim 1, wherein a first side and a second side of the first tab are oriented at an acute angle with respect to one another.

3. The case of claim 2, wherein one or more protrusions extend from the substantially planar portion of the bottom panel, and wherein the one or more protrusions resemble an outline of the dental treatment device.

4. The case of claim 3, wherein the one or more protrusions comprise:
a first plurality of the protrusions that resemble an outline of a curved tray of the dental treatment device; and
a second plurality of the protrusions that resemble an outline of a handle of the dental treatment device.

5. The case of claim 3, wherein a first opening extends from the inner surface of the bottom panel to the outer surface of the bottom panel, and wherein the first opening is positioned within the outline formed by the one or more protrusions.

6. The case of claim 5, wherein a second opening extends through a side of the bottom panel, the top panel, or both when the case is in the closed position.

7. A case for a dental treatment device, comprising:
a bottom panel having an inner surface and an outer surface, wherein the inner surface of the bottom panel defines a first concave portion that forms a corresponding first convex portion of the outer surface of the bottom panel, wherein a remainder of the bottom panel is substantially planar, wherein one or more protrusions extend from the outer surface of the bottom panel, and wherein the one or more protrusions resemble an outline of the dental treatment device;
a top panel having an inner surface and an outer surface, wherein the inner surface of the top panel defines a second concave portion that forms a corresponding second convex portion of the outer surface of the top panel; and
a hinge that directly joins the bottom panel and the top panel to one another and allows the bottom panel and the top panel to pivot between an open position and a closed position;
wherein the first concave portion and the second concave portion define an internal volume for storing the dental treatment device when the bottom panel and the top panel are in the closed position;
wherein the one or more protrusions comprise:
a first plurality of the protrusions that resemble an outline of a curved tray of the dental treatment device; and
a second plurality of the protrusions that resemble an outline of a handle of the dental treatment device.

8. The case of claim 7, wherein the bottom panel comprises a first tab, wherein the top panel comprises a second tab, wherein an upper surface of the first tab is substantially aligned with an upper surface of the second tab when the case is in the closed position, and wherein a lower surface of the first tab is substantially aligned with a lower surface of the second tab when the case is in the closed position.

9. The case of claim 7, wherein the one or more protrusions are configured to rest upon a surface upon which the case rests, such that a remainder of the bottom panel is spaced apart from the surface.

10. The case of claim 7, wherein the one or more protrusions comprise a first protrusion and a second protrusion that have different heights.

11. The case of claim 7, wherein a first opening extends from the inner surface of the bottom panel to the outer surface of the bottom panel.

12. The case of claim 11, wherein the first opening is positioned within the outline formed by the one or more protrusions.

13. The case of claim 12, wherein a second opening extends through a side of the bottom panel, the top panel, or both when the case is in the closed position.

14. The case of claim 7, wherein a wall defining the first convex portion includes a crescent-shaped tray-accommodating portion and a handle accommodating portion.

* * * * *